O. W. MOTLEY & D. J. ZEIEN.
TRANSMISSION FOR MOVING PICTURE MACHINES.
APPLICATION FILED NOV. 12, 1915.
1,203,238.
Patented Oct. 31, 1916.
2 SHEETS—SHEET 1.
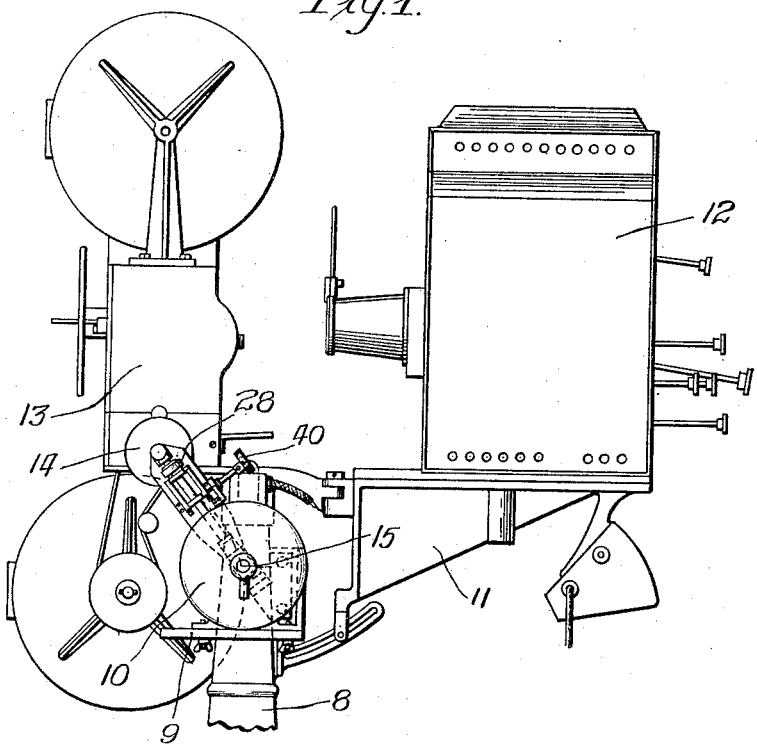
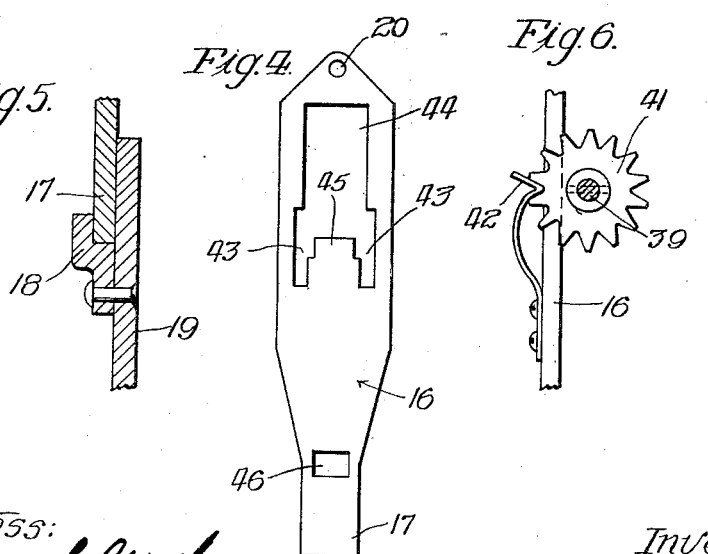

O. W. MOTLEY & D. J. ZEIEN.
TRANSMISSION FOR MOVING PICTURE MACHINES.
APPLICATION FILED NOV. 12, 1915.

1,203,238.

Patented Oct. 31, 1916.
2 SHEETS—SHEET 2.

Witness:
Harry S. Gaither

Inventor
Oliver W. Motley
Dominic J. Zeien
by Banning & Banning
Attys.

UNITED STATES PATENT OFFICE.

OLIVER WENDELL MOTLEY AND DOMINIC JOSEPH ZEIEN, OF CHICAGO, ILLINOIS, ASSIGNORS TO NO-BELT MOTION PICTURE MACHINE DRIVE COMPANY, A COPARTNERSHIP CONSISTING OF SAID MOTLEY AND SAID ZEIEN.

TRANSMISSION FOR MOVING-PICTURE MACHINES.

1,203,238.      Specification of Letters Patent.     Patented Oct. 31, 1916.

Application filed November 12, 1915. Serial No. 61,124.

*To all whom it may concern:*

Be it known that we, OLIVER W. MOTLEY and DOMINIC J. ZEIEN, both citizens of the United States, residing at Chicago, in the county of Cook and State of Illinois, have invented certain new and useful Improvements in Transmission for Moving-Picture Machines, of which the following is a specification.

This invention relates to a new and improved transmission designed primarily for use on moving picture machines, and is concerned particularly with its various component elements, and their relation to each other, as well as their relation to the machine.

Among the objects of our invention, we have sought to provide a transmission which is both simple and inexpensive, and dependable in service; a transmission which is readily detachable from the machine, and from the source of power with which it is connected; a transmission provided with means for varying the speed of the driven element; and a transmission in which the speed of the driven element may be changed at will during operation of the machine, and remain set for any desired speed within the range of its construction.

The invention consists further in numerous other features of construction, and combinations of parts as will more fully hereinafter appear.

In power driven motion picture machines it is common to employ one or more belts and pulleys therefor to transmit power from the motor to the projecting apparatus. A variation in the speed between the driving and driven shafts is possible only by a shifting of the belts,—an expedient which, at best, is inconvenient. In machines of this character it is frequently desirable that the transmission between the driving and driven elements be removable to permit access to the interior of the machine for purposes of cleaning or repairing. Where a fixed transmission is employed between the driving and driven elements, such an end is not ordinarily attainable.

The device of the present invention combines the desirable features of a positive transmission, capable of varying the speed of the driven element, with detachability from the machine by the removal of but a single locking element.

Figure 2:
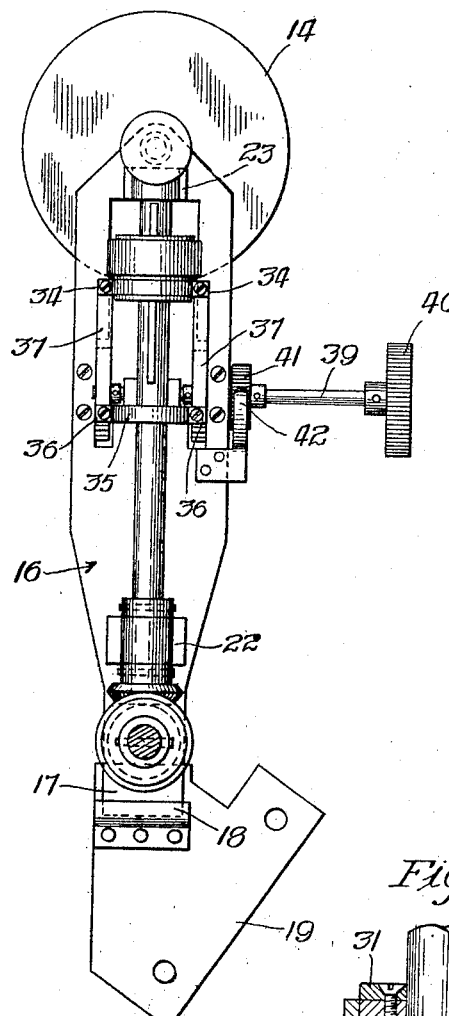
Figure 3:
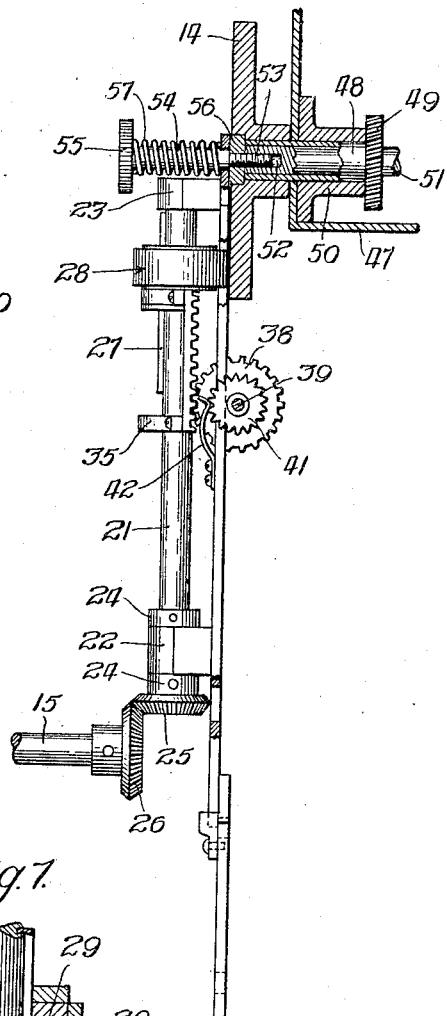
Figure 7:
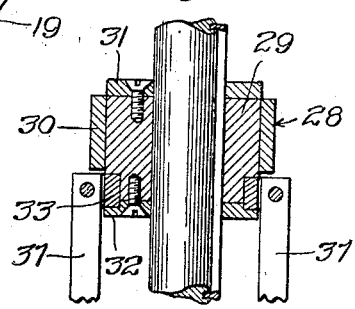

In the drawings: Figure 1 is a side elevation of a moving picture machine in which the present transmission is shown operatively mounted; Fig. 2 is a front view of the transmission detached from the machine; Fig. 3 is a side elevation of the transmission shown in Fig. 2; Fig. 4 is a plan view of the plate or frame on which the transmission is carried; Fig. 5 is a detail of the means for locking the transmission to the motor bracket; Fig. 6 is a detail of the locking means used to maintain the transmission in any given position of adjustment; and Fig. 7 is a detail in cross section of the friction wheel employed in the transmission.

To assist in a better understanding of the application of my invention, we have shown in Fig. 1 a moving picture machine of ordinary construction, comprising a pedestal 8, carrying a motor supporting bracket 9, on which a motor 10 is mounted, a lamp house bracket 11, on which a lamp house is mounted, and a projecting apparatus 13, the mechanism of which is suitably incased and supported above the motor. A disk 14 is secured to the driven shaft of the projecting apparatus, and as appears from Fig. 1 this is situated somewhat forwardly of the motor shaft 15. In consequence of this disposition of the axes of the driving shaft of the motor and the driven shaft of the projector, the transmission which forms the subject matter of the present invention is required to lie obliquely in the direction determined by the axes of the two shafts noted.

In Fig. 4 we have shown the frame 16 of the transmission which is in the form of a plate, having openings therein through which portions of the transmission may project. The lower end of this frame is shaped to provide a tongue 17 adapted to lie within a socket 18, which may be carried by a supporting plate 19 carried on the motor bracket 9. At its upper end the plate is provided with an opening 20 through which an attaching medium may pass to secure the frame to the projecting apparatus.

Referring now more particularly to Figs. 2 and 3, the transmission comprises a shaft 21, journaled within suitable bearings 22 and 23, located each relatively near one end of the frame. To lock the shaft against longitudinal movement, we have provided collars 24 secured to the shaft, one on either side of the bearing 22. A beveled gear 25 is secured to the lower end of the shaft 21 and in a position to engage with a second beveled gear 26, mounted on the end of the motor driving shaft 15. Manifestly, when the motor is operated, rotation is imparted also to the shaft 21.

A key 27 is secured to the shaft 21 at its upper end, as appears best in Figs. 2 and 3. A friction wheel 28 is slidably arranged upon this shaft near the upper end, consisting of a hub portion 29 (see Fig. 7) and a peripheral portion 30, formed of a relatively non-slipping material. This wheel is reinforced at its ends by means of plates 31 and 32. A peripheral recess is formed between the plate 32 and the hub 29, within which lies a collar 33, having on opposite sides thereof projecting lugs 34. The hub 29, as well as the adjacent plates 31 and 32 are each slotted to receive the key 27, and thereby become fixedly locked to the shaft against relative rotation therewith. The collar 33, however, does not come in contact with the key 27, whereby the collar is free to revolve with respect to the shaft 21. A second collar 35 is also mounted upon the shaft being equipped with oppositely disposed lugs 36, similar to the lugs 34 on the collar 33. This collar 35 is situated relatively lower than the position occupied by the key 27, and is limited in its movement toward the upper end of the frame by engagement with the end of the key. The collars 33 and 35 are spaced a fixed distance apart by means of two rack bars 37 which are secured to the lugs 34 and 36, as best shown in Fig. 2. Pinions 38, one in engagement with each of the rack bars, are mounted on a controlling shaft 39, which is arranged to be operated by a hand wheel 40. It is intended that rotation of the shaft 39 will impart a longitudinal movement to the rack bars 37 in consequence of which the friction wheel 38 may be moved in a longitudinal direction upon the shaft. In order to lock the friction wheel in any given position of adjustment, I have provided a serrated wheel 41, also secured to the shaft 39, which may be engaged by a tension member 42 (see Fig. 6). In order to effect rotation of the shaft 39, it is necessary, of course, that sufficient rotative power be applied to overcome the tension of the member 42.

It will be noted that the shaft 39 is mounted on the side of the frame 16 opposite that on which the shaft 27 is carried. The pinions 38 are accordingly projected through the frame through the openings 43, which are shown in the plan view of the frame in Fig. 4. The friction wheel, likewise, is also of such a diameter as to be projected through the frame, an elongated opening 44 being provided therein for this purpose. The slots 43 are separated by an intermediate portion 45, which serves as a stop member to determine how far the friction wheel may be longitudinally brought toward the motor shaft. The opening 46 shown near the lower end of the frame is intended to give clearance to the beveled gear 25.

We will now describe the driving connection between the transmission and the projecting apparatus in the machine.

In Fig. 3 there is shown in section a portion of the casing 47, within which the projecting mechanism is mounted. This mechanism is operated through the medium of a driven shaft 48, which is in the form of a sleeve, having a driving pinion 49 at its inner end. As the projecting apparatus forms no part of the present invention, we have deemed it unnecessary to illustrate the same. It may be stated, however, that the driving pinion 49 may be operatively connected with the projecting mechanism to actuate the same. The shaft 48 may be suitably journaled within a bearing 50 as shown. Within the hollow shaft 48 a non-rotatable shaft 51 is located, this shaft as well as the shaft 48 being extended through to the exterior of the casing 47. The outer extremity of the shaft 51 is provided with a socket 52, threaded to receive the threaded end 53 of a pin 54. This pin is arranged to pass through the opening 20 of the frame (see Fig. 4), its threaded extremity 53 being of a somewhat reduced diameter. The operating end of the pin 54 is formed with a milled wheel 55 to facilitate manipulation thereof. The disk 14, previously adverted to in connection with Fig. 1 is secured to the shaft 48, being spaced away from the frame, so as not to engage therewith by means of a washer or collar 56. A coiled spring 57 surrounds the pin 54, having its ends engaging with the milled wheel 55 and the frame 16. When the parts are related, as shown in Fig. 3, the friction wheel 28 protruding through the opening 44 is brought to bear against the disk 14 to impart rotation thereof. The degree of pressure with which the friction wheel 28 engages with the disk 14 is determined by the tension of the spring 58. Slipping between the friction wheel and the disk is prevented by rotating the pin 54 into the socket 52 a distance sufficient to enable the tension spring 58 to hold the friction wheel against the disk with the requisite pressure.

It will be apparent that the transmission is secured in operative position solely by means of the tongue 17 engaging within the socket 18 and the pin 54 entering into the socket 52. Removal of the pin 54 enables the entire transmission as a unit to be removed from the machine. This is a very desirable end as access to the interior of the projecting apparatus is thereby facilitated for purposes of cleaning, or adjustment or any other reasons.

From the foregoing description the operation of our transmission will be apparent.

When the motor 10 is operated, the transmission shaft 21 will likewise be rotated, and the friction wheel 28 will drive the disk 14 to actuate the projecting mechanism. The speed at which the projector is operated depends upon the position which the friction wheel 28 assumes with respect to the axis of the disk 14. As previously explained, the hand wheel 40 operating through the controlling shaft 39 may be manipulated to move the friction wheel 28 longitudinally upon the shaft 21, thereby determining the point of engagement between the friction wheel and the disk 14. Irrespective therefore of any means for controlling the speed of the motor, the projector may be operated at any desired speed simply by adjustments in the position of the friction wheel 28, effected through manipulation of the hand wheel 40.

We claim:

1. In combination with a motion picture machine having a power shaft and a driven shaft for the projector, a transmission embodying a transmission shaft, an operative connection between the power shaft and the transmission shaft, a disk on the driven shaft, a friction wheel upon the transmission shaft arranged to revolve therewith, and in engagement with the disk to impart rotation thereto, and means for changing the engaging position of the friction wheel upon the disk whereby the relative rotative speeds between the transmission shaft and the driven shaft may be varied, said means comprising a collar secured to the friction wheel and free from rotation therewith, a rack bar secured to the collar and disposed parallel to the axis of the transmission shaft, a controlling shaft disposed transversely to the rack bar, and a pinion mounted upon the controlling shaft in engagement with the rack bar, whereby the collar and friction wheel may be moved longitudinally upon the transmission shaft with rotation of the controlling shaft, substantially as described.

2. In combination with a motion picture machine having a power shaft and a driven shaft for the projector, a transmission embodying a transmission shaft, an operative connection between the power shaft and the transmission shaft, a disk on the driven shaft, a friction wheel upon the transmission shaft arranged to revolve therewith, and in engagement with the disk to impart rotation thereto, and means for changing the engaging position of the friction wheel upon the disk whereby the relative rotative speeds between the transmission shaft and the driven shaft may be varied, said means consisting of a collar secured to the friction wheel and free from rotation therewith, a second collar idly mounted upon the shaft, rack bars extending between the collars, a controlling shaft disposed transversely to the rack bars, and pinions mounted upon the controlling shaft, one in engagement with each of the rack bars whereby the collars and friction wheel are moved longitudinally upon the shaft with rotation of the controlling shaft, substantially as described.

3. In combination with a motion picture machine having a power shaft and a driven shaft for the projector, a transmission embodying a frame, a transmission shaft rotatably mounted upon the frame, a positive operative connection between the transmission shaft and one of the shafts upon the machine, a frictional connection between the transmission shaft and the other of the shafts upon the machine, and means for securing the transmission in operative position, comprising a tongue and socket connection between one end of the frame and the machine, and a threaded locking connection between the other end of the frame and the machine, substantially as described.

4. In combination with a motion picture machine having a power shaft and a driven shaft for the projector, a transmission embodying a frame, a transmission shaft rotatably mounted upon the frame, a positive operative connection between the transmission shaft and one of the shafts upon the machine, a frictional connection between the transmission shaft and the other of the shafts upon the machine, means for securing the transmission in operative position comprising a slidable locking connection between one end of the frame and the machine, and a threaded locking connection between the other end of the frame and the machine, and tension means coöperating with the threaded locking connection to control the pressure of the frictional connection between the transmission shaft and the shaft of the machine with which it maintains a frictional connection, substantially as described.

5. In combination with a moving picture machine having a power shaft and a driven shaft for the projector, a transmission embodying a frame, a transmission shaft rotatably mounted upon the frame, a positive operative connection between the power and transmission shafts, a frictional connection between the transmission and driven shafts, and means for securing the transmission in operative position, comprising a slidable locking connection between one end of the frame and the machine, and a threaded locking connection between the other end of the frame and the machine, substantially as described.

6. In combination with a moving picture machine having a power shaft and a driven shaft for the projector, a transmission embodying a frame, a transmission shaft rotatably mounted upon the frame, a positive operative connection between the power and transmission shafts, a frictional connection between the transmission and driven shafts, and means for adjusting the degree of pressure of said frictional connection, said means serving also to lock the frame in operative position upon the machine, substantially as described.

7. In combination with a moving picture machine having a power shaft and a driven shaft for the projector, a transmission embodying a transmission shaft, an operative connection between the power shaft and the transmission shaft, a disk on the driven shaft, a friction wheel slidingly mounted upon the transmission shaft and arranged to engage with the disk, means for preventing relative rotation between the friction wheel and the transmission shaft, comprising a key secured to the shaft, and a slot in the friction wheel within which the key may engage, and means for changing the engaging position of the friction wheel upon the disk, whereby the relative rotative speeds between the transmission shaft and the driven shaft may be varied, the key being adapted to serve as a stop member for determining the limit of longitudinal movement of the friction wheel upon the transmission shaft in one direction, substantially as described.

8. In combination with a moving picture machine having a power shaft and a driven shaft for the projector, a transmission embodying a frame, a transmission shaft rotatably mounted upon the frame, an operative connection between the power and transmission shafts, a friction wheel upon the transmission shaft arranged to revolve therewith and to slide longitudinally thereupon, there being a longitudinal opening in the frame through which the friction wheel projects, and which determines the limit of its longitudinal movement in one direction, means for causing the friction wheel to be moved longitudinally upon the shaft, and a disk secured to the driven shaft arranged to be contracted by the friction wheel, whereby motion is imparted from the transmission shaft to the driven shaft, substantially as described.

9. In combinatiton with a moving picture machine having a power and driven shaft for the projector, a frame detachably secured to the machine, and carrying thereon a transmission consisting of a transmission shaft, a positive operative connection between the transmission shaft and one of the other shafts, and a frictional connection between the transmission shaft and the remaining shaft, substantially as described.

OLIVER WENDELL MOTLEY.
DOMINIC JOSEPH ZEIEN.

Witnesses:
EPHRAIM BANNING,
FRANCES M. FROST.

Copies of this patent may be obtained for five cents each, by addressing the "Commissioner of Patents, Washington, D. C."